Feb. 8, 1966  F. NETTEL ETAL  3,233,659
HEAT EXCHANGER USING HOLLOW AS HEAT CARRIER
Filed July 3, 1962
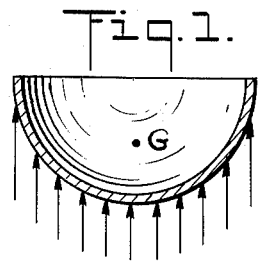
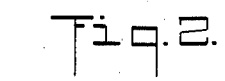
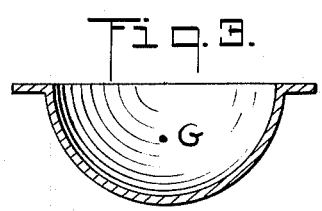
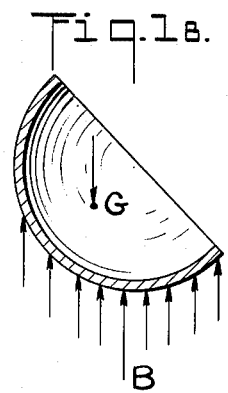
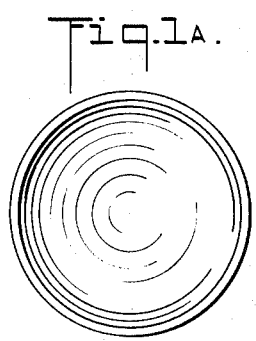
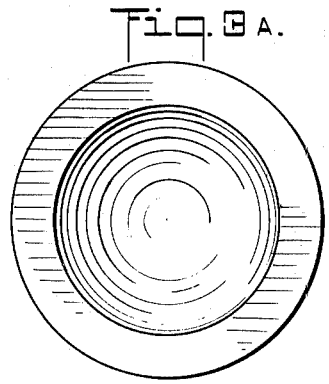
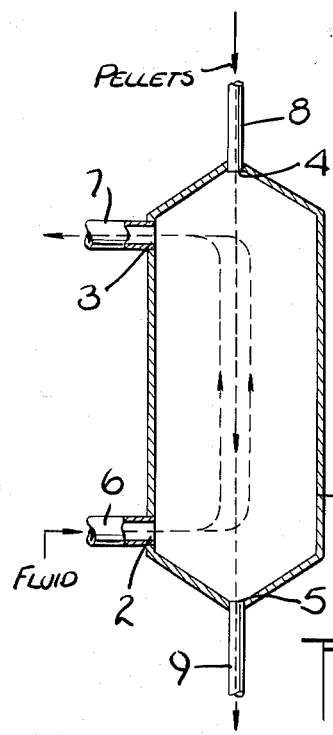
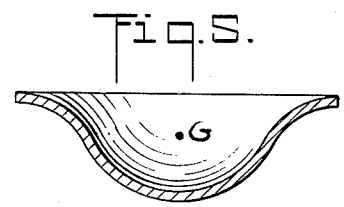
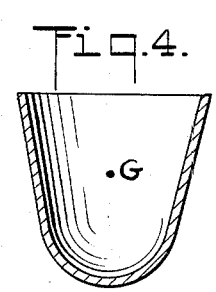
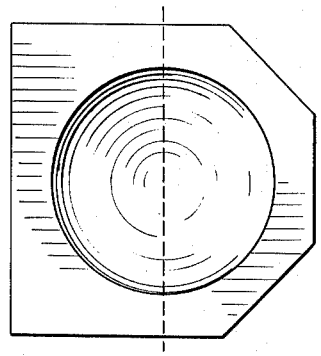
INVENTORS
Frederick Nettel
John Treitner

United States Patent Office 3,233,659
Patented Feb. 8, 1966

3,233,659
HEAT EXCHANGER USING HOLLOW METAL
PELLETS AS HEAT CARRIER
Frederick Nettel, 173 Chapel Road, Manhasset, N.Y., and
John Kreitner, 123 Salisbury Ave., Garden City, N.Y.
Filed July 3, 1962, Ser. No. 207,322
9 Claims. (Cl. 165—4)

This invention deals with comminuted solid bodies (pellets) used to transfer heat from or to a fluid stream by contact with said stream, in particular from or to gases in relative motion to said comminuted bodies.

It is known to use a multitude of such bodies, called pellets, for the purposes of this specification for heat transfer. Known materials include metals, carbides, ceramics, stones, glass, for example, in shapes from irregular granules to spheres of more or less equal size. Also tubular cuts (Raschig rings), and flat pieces of circular or other shapes are known.

Non-metallic pellets are subject to abrasion during handling and to breakage, if subjected to thermal shocks, which is not acceptable for many purposes. They are also difficult to manufacture in uniform sizes to close tolerances.

As long as the pellets are at rest or moving slowly in packed condition, their particular shape is unimportant and their size is only important in that a high ratio of surface to weight is desired. These conditions change radically if both pellets and the gas from or to which heat is to be transferred move with substantial velocities, for example, with the pellets falling under the influence of gravity in counterflow to a rising stream of gas. Good heat transfer requires not only large contact surfaces but also sufficient time (retention time). Besides, it is for economic reasons desired to effect heat transfer at low gas velocities i.e. with small pressure losses in the gas stream.

It is known to reduce the fall velocity of conventional pellets by the action of an upward gas stream impinging on their surface. In this case the shape of the individual pellets is of secondary importance. It is, however, important to reduce their terminal velocity, viz, that relative velocity of gas and pellets at which the upward drag equals the pellet weight. This consideration leads to the use of materials of small density, such as specific gravity in the range of 2 to 4 (with water as 1). Carbides, mullite and aluminum oxide in sintered form have been proposed. The use of light metals such as aluminum or magnesium is restricted due to their low melting points and proneness to oxidation and corrosion.

It is the principal object of this invention to provide pellets made of material of high specific gravity which nevertheless attain low terminal velocity due to their special shape. It is a further object of this invention to avoid, by use of such materials, abrasion, corrosion and breakage due to heat shock.

It is another object of this invention to provide pellets which can be economically produced within close tolerances of weight and shape.

These and other advantages will become clear from the following description, taken together with the drawing which shows in diagrammatic form embodiments of the invention by way of non-limiting examples.

In the drawings:

FIG. 1 shows a sectional view of a semi-spherical pellet and FIG. 1a a view from the top. The center of gravity is marked G. FIG. 1b indicates the same pellet shown in an inclined position with the forces of an upward gas stream indicated by arrows. The resultant of all these forces is indicated by the line B.

FIG. 2 depicts a pellet of spherical segment shape.

FIG. 3 illustrates a section of a part-spherical pellet with an outwardly extended collar. FIG. 3a is a view of this pellet from the top. FIG. 3b shows a modification of the collar in a square and octagonal shape.

FIG. 4 illustrates a pellet of paraboloid form.

FIG. 5, a pellet of spherical segment shape with collar curved outwardly, and

FIG. 6 shows diagrammatically in vertical cross section a heat exchanger for using cup-shaped pellets.

The principal object of this invention is achieved by providing individual pellets made of thin metal sheet formed into hollow cup-like shapes.

Another object of this invention is achieved by using sheet metal having resistance to heat shock, abrasion, oxidation, and corrosion at high temperatures.

A further object of this invention is achieved by using sheet metal of a thickness not larger than 10 percent of the largest width of the cup opening.

Still another object of this invention is achieved by making the cups of part-spherical shape.

The various pellet forms shown in the drawing will fall in the gas stream with the openings upward. The centers of gravity are marked G. The upward forces created by the gas are symmetrically distributed with their resultant force opposing and in line with the gravity force. If for any reason the pellet inclines to the right, as shown in FIG. 1b, the gravity continues to pull it down in a line through G, but the forces exerted by the gas are now concentrated also to the right, with a resultant B to the right of the gravity line. As can be seen, the forces G and B form a righting moment (similar to that in a surface ship) bringing the pellet back to the original position, in which the greatest frontal area is exposed to the gas flow and therefore the greatest retarding force is exerted on the pellet. Similar righting moments prevail for other cup forms.

Experiments by the applicants show that while pellets of semi-spherical (FIG. 1) or spherical-segment (FIG. 2) forms show the greatest stability in descent, they may not show the slowest descent over a given height for pellets of the same weight. It can be shown that a combination of various cup shapes with peripheral flanges as shown in FIGS. 3, 3a, 3b, or FIG. 5 by way of example, result in more or less zig-zag descent of smaller average downward velocity. The frequency of the zig-zag movement has been found to decrease with the width of the peripheral flange. The stability of these pellets remains sufficient for practical purposes.

It is apparent from the several figures of the drawing that the contour of the outer surface of any given pellet is identical to the contour of the inner surface of such pellet.

With respect to terminal velocity, a thin-walled cup shape behaves like a solid sphere of much smaller density. For example, a semi-spherical steel shell of a thickness of $\frac{1}{20}$ of the diameter has a terminal velocity equal to that of a solid sphere of only 1.4 density.

With regard to heat transfer, the mentioned steel cup has an effective surface of more than 50% of that of a solid sphere of the same diameter, but weighs only 40% of a corundum sphere, and has a heat storage capacity of only 20% of that of a corundum sphere, resulting in correspondingly quicker heat transfer (reduced retention time).

For economic reasons it is important to keep the costs of pellets as low as possible, especially since many millions of pellets may be needed for a heat exchanger of a given capacity. The pellets according to this invention can be easily stamped out of thin sheet material and pressed into the required cup shape.

Stainless or other alloyed steel is the presently preferred material for the pellets in spite of its higher price per ton. This is more than compensated by resistance to breakage by heat shock, and to abrasion, oxidation and corrosion when exposed to combustion gases or other gases containing for example acids or vanadium pentoxide, resulting in a very long service life.

Reverting in more detail to FIG. 6 showing a heat exchanger for using the special pellets described above, in which 1 is a closed upright chamber with a first opening 2 near its bottom for fluid inlet, a second opening 3 near its top for fluid outlet. A third opening 4 at the top of the chamber serves to receive pellets while a fourth opening 5 is for discharging pellets from the bottom of the chamber 1.

The openings 2 and 3 are connected to conduits 6 and 7, while the openings 4 and 5 are connected to the pellet pipes 8 and 9 as shown.

Assuming that the heat exchanger is to serve as air heater, a stream of hot pellets is introduced into the chamber 1 through the pellet pipe 8 and is permitted to fall through said chamber distributed over the chamber cross section by conventional means known per se. The pellets accumulate near the opening 5 through which they are discharged via the pellet pipe 9.

At the same time cool fluid is introduced via the conduit 6, flowing upwards through the chamber and leaving via the conduit 7. Within the chamber pellets and fluid are in counterflow, exchanging heat so that the air is heated while the pellets reach the opening 5 in cooled condition. Due to the special shape of the pellets they act as individual miniature parachutes, falling relatively slowly, thereby increasing their residence time within the chamber, thereby achieving efficient heat exchange with a chamber of low height. Naturally, it is possible to use the same type of chamber, known per se, for heating cool pellets by a hot fluid led in counterflow to the pellets.

The core of this invention lies in the use of cup-shaped self-stabilizing pellets resulting in new and unique effects which make highly efficient and economic operation of pellet-type heat exchangers possible.

It is immaterial for the purposes of this invention in what particular type and design of heat exchanger the pellets are used, what kind of fluids are processed therein and at what temperatures the pellets have to work.

Having now described and illustrated embodiments of the invention, we wish it to be understood that our invention is not limited to the specific forms and arrangements hereinbefore described and shown, or specifically covered by the claims.

What we claim is:

1. In a heat exchanger wherein a multitude of pellets fall in counterflow to a rising fluid stream at a temperature different from that of the pellets including a closed upright chamber having a first opening near its bottom for receiving a stream of said fluid, a second opening near its top for discharging said fluid, a third opening near its top for receiving a stream of pellets, a fourth opening at its bottom for discharging said stream of pellets, first conduit means for leading said fluid into said first opening, second conduit means for discharging the fluid from said second opening after it has passed through the said chamber in upward direction, first pellet pipe means for leading a stream of pellets from a source into said third opening, second pellet pipe means for leading said stream of pellets, after it has passed at least partly under gravity in free fall through the said chamber, the improvement of employing cup-shaped pellets made of thin-walled metal having identical inner and outer contours, and having their centers of gravity disposed below the plane across the cup opening while the cups are in upright position, so as to automatically stabilize all pellets during their fall through said chamber with the cup openings in uppermost positions.

2. A heat exchanger as set forth in claim 1, employing pellets of hollow substantially semi-spherical shapes.

3. A heat exchanger as set forth in claim 1, employing pellets of hollow spherical segment shapes.

4. A heat exchanger as set forth in claim 1, employing pellets made of alloyed steel sheet to reduce deterioration during cyclical heating and cooling, heat shock, oxidation, corrosion by the processed fluids and impact with other bodies.

5. A heat exchanger as set forth in claim 1, employing pellets of hollow cup-like shapes having peripheral flanges extending outwardly from the rim of the cups.

6. A heat exchanger as set forth in claim 5, employing peripheral flanges of ring shape.

7. A heat exchanger as set forth in claim 5, employing pellets having peripheral flanges of rectangular shape.

8. A heat exchanger as set forth in claim 5, employing pellets having peripheral flanges of multilateral shape.

9. A heat exchanger as set forth in claim 1, employing pellets made of sheet metal of a thickness not larger than ten percent of the diameter of the cup opening.

References Cited by the Examiner

UNITED STATES PATENTS

| | | | |
|---|---|---|---|
| 1,614,387 | 1/1927 | Pereda | 165—107 |
| 3,117,625 | 1/1964 | Fraenkel | 165—185 |

FOREIGN PATENTS

| | | |
|---|---|---|
| 103,771 | 6/1899 | Germany. |
| 445,045 | 4/1936 | Great Britain. |

ROBERT A. O'LEARY, *Primary Examiner.*

CHARLES SUKALO, *Examiner.*